(12) United States Patent
Hsieh et al.

(10) Patent No.: US 7,061,900 B1
(45) Date of Patent: Jun. 13, 2006

(54) ELECTRONIC COMMERCE DISTRIBUTED NETWORK AND METHOD

(75) Inventors: Francis Hsieh, Powell, OH (US); Brad Manring, Dublin, OH (US)

(73) Assignee: Sterling Commerce, Inc., Dublin, OH (US)

( * ) Notice: Subject to any disclaimer, the term of this patent is extended or adjusted under 35 U.S.C. 154(b) by 846 days.

(21) Appl. No.: 09/901,402

(22) Filed: Jul. 9, 2001

Related U.S. Application Data

(62) Division of application No. 08/884,882, filed on Jun. 30, 1997, now Pat. No. 6,259,700.

(51) Int. Cl.
*H04L 12/28* (2006.01)

(52) U.S. Cl. .................. 370/351; 705/26; 705/37; 370/400

(58) Field of Classification Search ........... 370/351, 370/216, 219, 400, 220, 217, 241, 242, 243, 370/252, 254, 245; 709/223, 224, 221; 705/26
See application file for complete search history.

(56) References Cited

U.S. PATENT DOCUMENTS

| | | | | |
|---|---|---|---|---|
| 5,008,814 A | * | 4/1991 | Mathur | 709/221 |
| 5,504,921 A | | 4/1996 | Dev et al. | 395/800 |
| 5,577,202 A | * | 11/1996 | Padgett | 709/206 |
| 5,758,126 A | * | 5/1998 | Daniels et al. | 715/780 |
| 5,790,548 A | | 8/1998 | Sistanizadeh et al. | 370/401 |
| 5,802,146 A | | 9/1998 | Dulman | 379/34 |
| 5,835,696 A | * | 11/1998 | Hess | 714/10 |
| 5,950,173 A | * | 9/1999 | Perkowski | 705/26 |
| 5,964,831 A | * | 10/1999 | Kearns et al. | 709/201 |
| 5,974,406 A | * | 10/1999 | Bisdikian et al. | 707/1 |
| 6,108,782 A | | 8/2000 | Fletcher et al. | 713/153 |
| 6,125,352 A | * | 9/2000 | Franklin et al. | 705/26 |
| 6,192,034 B1 | * | 2/2001 | Hsieh et al. | 370/241 |
| 6,259,700 B1 | * | 7/2001 | Hsieh et al. | 370/400 |
| 6,772,216 B1 | * | 8/2004 | Ankireddipally et al. | 709/230 |
| 6,907,401 B1 | * | 6/2005 | Vittal et al. | 705/26 |

\* cited by examiner

*Primary Examiner*—Hassan Kizou
*Assistant Examiner*—Ricardo Pizarro
(74) *Attorney, Agent, or Firm*—Baker Botts L.L.P.

(57) ABSTRACT

An electronic commerce distributed network is disclosed that includes a plurality of interconnected processing nodes. Each processing node (50) includes a first sub-node (52) and a second sub-node (54) that are connected to communicate information and are in geographically remote locations. The first sub-node (52) of each processing node (50) has an active state in which the first sub-node (52) communicates with other processing nodes and processes electronic commerce messages communicated with originator/recipient organizations. The second sub-node (54) of each processing node (50) has a mirror state in which the second sub-node (54) mirrors the first sub-node (52) as well as an active state in which the second sub-node (54) communicates with other processing nodes and processes electronic commerce messages communicated with originator/recipient organizations. The first sub-node (52) of each processing node (50) is initially in the active state, and the second sub-node (54) is initially in the mirror state. The second sub-node (54) is operable to switch to the active state if the first sub-node (52) fails, such that each processing node in the electronic commerce distributed network can maintain operation in the event the first sub-node of that processing node experiences failure.

19 Claims, 2 Drawing Sheets

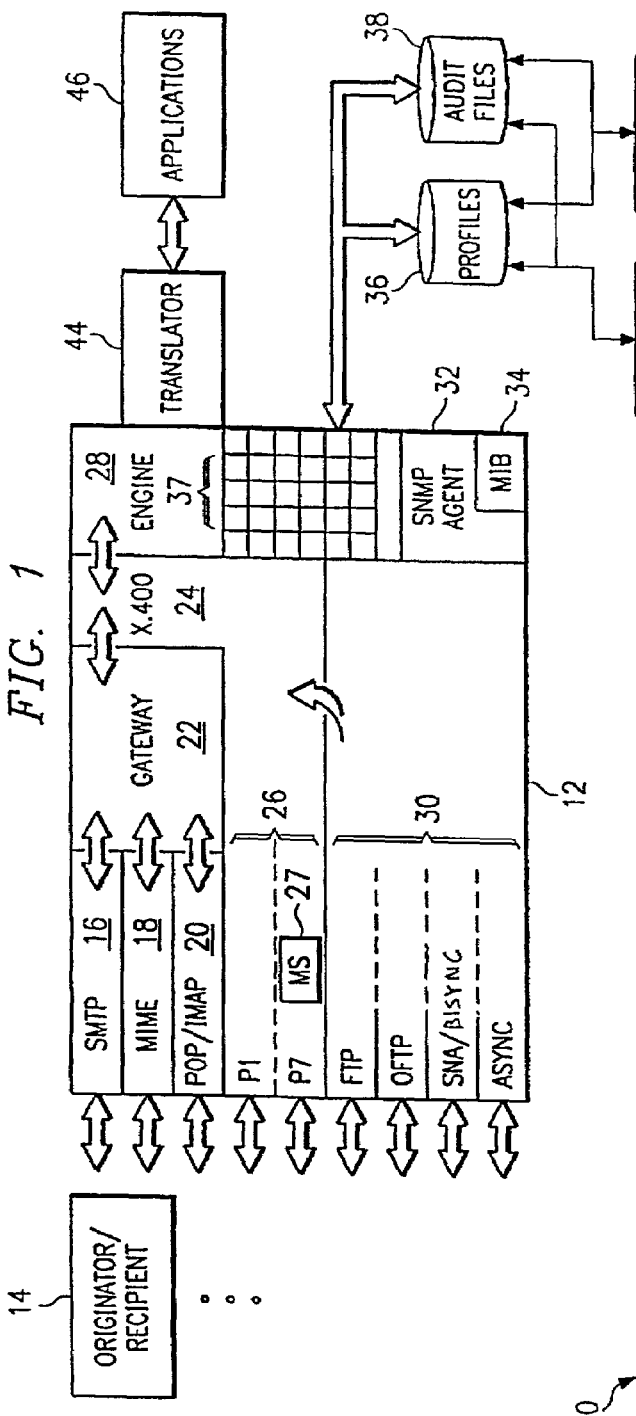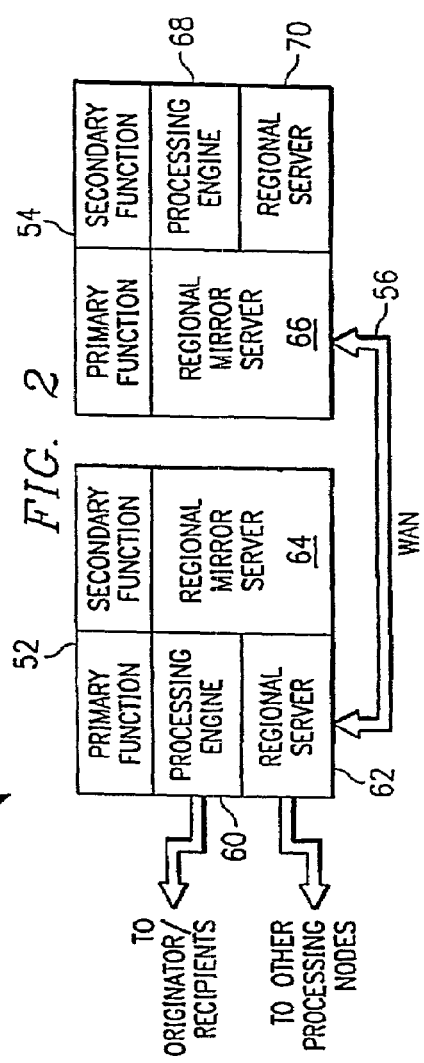

ELECTRONIC COMMERCE DISTRIBUTED NETWORK AND METHOD

CROSS REFERENCE TO RELATED APPLICATIONS

This application is a divisional of U.S. application Ser. No. 08/884,882 filed Jun. 30, 1997 entitled "Electronic Commerce Distributed Network and Method", now U.S. Pat. No. 6,259,700 issued Jul. 10, 2001.

This application is related to U.S. application Ser. No. 08/885,395, filed Jun. 30, 1997, and entitled SYSTEM AND METHOD FOR NETWORK INTEGRITY MANAGEMENT, now U.S. Pat. No. 6,192,034 issued Feb. 20, 2001.

TECHNICAL FIELD OF THE INVENTION

This invention relates in general to the field of electronic commerce, and more particularly to an electronic commerce distributed network and method.

BACKGROUND OF THE INVENTION

Organizations in various industries use electronic commerce for communicating business information including purchase order and order supply information. One method for communicating electronic commerce information uses a value added network as a clearing house for messages between organizations. The value added network thereby allows organizations to participate in electronic commerce in an efficient and cost effective manner. Such a value added network provides connectivity for participating organizations and, in general, can receive messages from originator organizations, process the messages, and forward appropriate messages to recipient organizations. Since many organizations have dissimilar computer environments, the value added network provides advantages to the participating organizations by interfacing with and between the dissimilar environments. An organization that is an originator of a message need only transmit its message to the value added network and is not forced to worry about communicating directly with intended recipient organizations.

However, value added networks can suffer from a number of problems. For example, conventional value added networks are typically architected to have geographically centralized processing which can increase costs of connection for geographically remote organizations. In addition, conventional value added networks can suffer from a susceptibility to catastrophic failure produced by exterior causes such as power failure or problems with public communication networks. Also, where a global public data network, such as the Internet, is used to provide the backbone for communications, additional problems with security, reliability and performance are introduced into the network.

SUMMARY OF THE INVENTION

In accordance with the present invention, an electronic commerce distributed network and method are disclosed that substantially eliminate or reduce disadvantages and problems associated with previously developed electronic commerce networks.

According to one aspect of the present invention, an electronic commerce distributed network is provided that includes a plurality of interconnected processing nodes. Each processing node includes a first sub-node and a second sub-node. The first and second sub-nodes of each processing node are connected to communicate information and are in geographically remote locations. The first sub-node of each processing node has an active state in which the first sub-node communicates with other processing nodes and processes electronic commerce messages communicated with originator/recipient organizations. The second sub-node of each processing node has a mirror state in which the second sub-node mirrors the first sub-node as well as an active state in which the second sub-node communicates with other processing nodes and processes electronic commerce messages communicated with originator/recipient organizations. The first sub-node of each processing node is initially in the active state, and the second sub-node is initially in the mirror state. The second sub-node is operable to switch to the active state if the first sub-node fails, such that each processing node in the electronic commerce distributed network can maintain operation in the event the first sub-node of that processing node experiences failure.

According to another aspect of the present invention, a processing engine for a processing node of an electronic commerce distributed network is provided. The processing engine includes a plurality of communication units operable to communicate with participating organizations in a plurality of communication protocols. The plurality of communication units are further operable to receive electronic commerce messages from originator organizations and communicate electronic commerce messages to recipient organizations. The processing engine also includes an engine that is operable to process an electronic commerce message received from an originator organization and to build an outgoing electronic commerce message for transmission to a recipient organization. The engine accomplishes processing and building by accessing profiles that define characteristics for the originator organization and the recipient organization and by invoking selected functions from a matrix of functions where the selected functions are chosen based upon the profiles for the originator organization and the recipient organization. An interface unit is coupled to and communicates with the plurality of communication units and the engine to allow incoming and outgoing electronic commerce messages to be communicated between the plurality of communication units and the engine. In this manner, the processing engine provides electronic commerce interconnectivity for participating organizations that have different computer and communication environments.

According to a further aspect of the present invention, a method of operation for an electronic commerce distributed network is provided that includes forming a processing node having a first sub-node and a second sub-node in geographically remote locations where the first and second sub-nodes are connected to communicate information. The first sub-node is operated in an active state to communicate with other processing nodes and to process electronic commerce messages communicated with originator/recipient organizations. The second sub-node is operated in a mirror state to mirror the first sub-node while the first sub-node is operated in the active state. The second sub-node is switched, if the first sub-node fails, to operate in an active state to communicate with other processing nodes and to process electronic commerce messages communicated with originator/recipient organizations. The operation of the electronic commerce distributed network is thereby maintained in the event the first sub-node experiences failure.

A technical advantage of the present invention is an architecture for an electronic commerce network that includes multiple processing nodes so that processing of electronic commerce messages is distributed to the various processing nodes. This distributed network provides increased access speed and service for participating organizations at reduced connectivity costs.

Another technical advantage of the present invention is that the processing nodes of the electronic commerce distributed network each includes an active sub-node and a mirror sub-node where the mirror sub-node maintains an accurate copy of the state of the active sub-node. In addition, the roles of the active sub-node and the mirror sub-node can be switched such that the mirror sub-node becomes active and the active sub-node becomes the mirror. This aspect of the present invention allows each processing node, and thus the network to be robust in sustaining operation through a loss of a sub-node.

A further technical advantage of the present invention is the provision of processing node in an electronic commerce network that can process incoming and outgoing electronic commerce messages based upon a profile of the originator/recipient organizations and by using a function matrix within the processing node. The processing node can thereby interface between originator/recipient organizations according to the particular characteristics of each organization as defined in its profile. The function matrix allows the processing node to invoke only those message processing functions appropriate for the specific originator/recipient organizations.

BRIEF DESCRIPTION OF THE DRAWINGS

A more complete understanding of the present invention and advantages thereof may be acquired by referring to the following description taken in conjunction with the accompanying drawings in which like reference indicate like features, and wherein:

FIG. 1 is block diagram of one embodiment of a processing engine for a processing node of an electronic commerce distributed network constructed according to the teachings of the present invention;

FIG. 2 is a block diagram of one embodiment of a processing node of an electronic commerce distributed network constructed according to the teachings of the present invention;

DETAILED DESCRIPTION OF THE INVENTION

Figure 3:
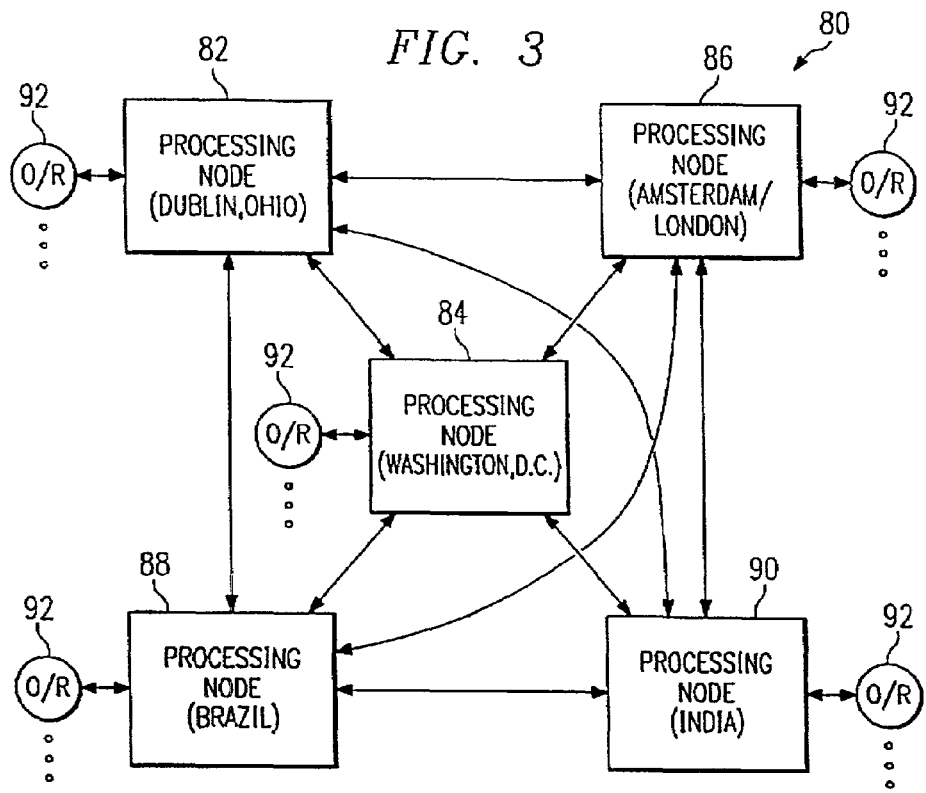
FIG. 3 is a block diagram of one embodiment of a plurality of processing nodes forming an electronic commerce distributed network according to the teachings of the present invention.

FIG. 1 is a block diagram of one embodiment of a processing engine 12 for a processing node of an electronic commerce distributed network constructed according to the teachings of the present invention. Processing engine 12 provides connectivity and message processing and delivery for a plurality of originator/recipient organizations 14 that participate in electronic commerce by communicating electronic messages. Each organization 14 can communicate with processing engine 12 using one of a plurality of communication networks and associated network communication protocols.

Processing engine 12 includes a simple mail transfer protocol (SMTP) unit 16 that can provide dedicated mail messaging capabilities to an organization 14. Processing engine 12 also includes a multipurpose Internet messaging extension (MIME) unit 18 that also provides a dedicated mail message functionality for an organization 14. Processing engine 12 further includes a post office protocol (POP) unit or IMAP (Internet message application protocol) unit 20 that can provide a post office for electronic commerce messages for an organization 14. SMTP unit 16, MIME unit 18, and POP/IMAP unit 20 are connected to and communicate with a gateway unit 22. Gateway unit 22 is connected to an X.400 unit 24. Gateway unit 22 converts messages from the format associated with SMTP unit 16, MIME unit 18 or POP/IMAP unit 20 to the format associated with X.400 unit 24 and vice versa. Organizations 14 can also connect directly to X.400 unit 24 via X.400 connections, indicated generally at 26, which can include a P1 and a P7 connection. The P1 connection can provide an administrative management domain (ADMD) or a private management domain (PRMD) for an organization 14, while the P7 connection can provide a direct dial-up connection for an organization 14. The P7 connection can also include a message store unit 27. This message store unit 27 can store and provide messages to the X.400 unit 24 and to a connecting organization 14. Processing engine 12 can include additional communication links, indicated generally at 30. For example, additional links 30 can include FTP access, OFTP access, SNA/BISYNC access, and ASYNC access. Messages for these additional links 30 are translated into X.400 format and provided to X.400 unit 24. Processing engine 12 further includes a simple network management protocol (SNMP) agent 32 that maintains a management information base (MIB) 34. SNMP agent 32 and MIB 34 can be used by a system for network integrity management as discussed with respect to FIG. 4, below.

X.400 unit 24 is connected to an engine 28. X.400 unit 24 provides messages received from originator organizations 14 to engine 28 and receives from engine 28 messages to recipient organizations 14. After receiving a message from X.400 unit 24, engine 28 processes each message. This processing can include reviewing a profile 36 associated with the originator organization 14 and recipient organizations 14, selecting functions to invoke according to the profile 36 of the originator organization 14 and recipient organizations 14, and sending outgoing messages to X.400 unit 24 for communication to recipient organizations 14. Profiles 36 describe characteristics and parameters for each organization 14 with respect to how that organization 14 connects to and participates in electronic commerce. Engine 28 uses the information in profiles 36 as guidance for processing messages received from originator organizations 14 and to build messages for communication to recipient organizations 14. Engine 28 can invoke one or more of a matrix of functions, indicated generally at 37, for processing messages. Matrix of functions 37 can include performing electronic data interchange (EDI) conversion, generating acknowledgments, faxing, generating copies to appropriate organizations 14, performing encryption and decryption, performing encoding and decoding, virus checking, data integrity checking, providing reports, and providing translations. In general, matrix of functions 37 can include any functionality needed for processing messages communicated between originator organizations 14 and recipient organizations 14. Engine 28 also maintains and accesses audit files 38 which provide a log of the message processing that has been performed by engine 28 with respect to each organization 14.

Processing engine 12 can provide organizations 14 with external access to profiles 36 and audit files 38 through, for example, an external user interface (GUI) 40 or an X.500 directory 42. User interface 40 provides a remote interface screen to allow organizations 14 to query and update profiles 36 and to review audit files 38. X.500 directory 42 provides a back end into profiles 36 through Internet access, or other public data network access, into X.500 directory 42. This X.500 directory 42 is generally for inquiry only, and can be based upon an LDAP or DUA format. X.500 directory 42 can provide, for example, public encryption keys based upon profiles 36 of each organization 14.

Processing engine 12 can also be connected to a translator unit 44 for providing an interface to existing applications 46 in a computer environment of an owner or operator of processing engine 12. Through applications 46 and translator unit 44, an operator or owner of processing engine 12 can participate in electronic commerce with organizations 14 through a high speed direct connection between engine 28 and applications 46.

FIG. 2 is a block diagram of one embodiment of a processing node, indicated generally at 50, for an electronic commerce distributed network constructed according to the teachings of the present invention. Processing node 50 includes a first sub-node 52 and a second sub-node 54. Sub-node 52 and sub-node 54 are connected with one another by a wide area network (WAN) 56, or other appropriate network connection. Sub-node 52 and sub-node 54 can be installed at geographically separate locations to isolate sub-node 54 from external or internal environment problems that may affect sub-node 52, and vice versa. Sub-node 52 and sub-node 54 each have a primary function and a secondary function where sub-node 52 is currently the active sub-node, and sub-node 54 is the mirror sub-node.

Sub-node 52 has a primary function which includes operating as a processing engine 60 and a regional server 62. Processing engine 60 of sub-node 52 can be a processing engine as shown in and described with respect to FIG. 1. The secondary function of sub-node 52 is as a regional mirror server 64. Regional server 62 provides a communication link to other processing nodes and to originator/recipients organizations. Regional server 62 also provides a communication link across WAN 56 to sub-node 54.

Sub-node 54 has a primary function which includes operating as a regional mirror server 66. The secondary function of sub-node 54 is as a processing engine 68 and a regional server 70. As with sub-node 52, processing engine 68 of sub-node 54 can be implemented as shown in and described with respect to FIG. 1. Regional mirror server 66 of sub-node 54 communicates with regional server 62 of sub-node 52 across WAN 56.

In one embodiment of the present invention, sub-node 52 and sub-node 54 are implemented on a computer work station running a windows NT platform and executing the processing engine, regional server and regional mirror server applications. In this embodiment, WAN 56 can be a frame relay, ATM or IP network. Also in this embodiment, processing node 50 uses a technology referred to as OCTOPUS for performing the mirroring as a relatively low level, I/O buffer, two phase commit process between sub-node 52 and sub-node 54.

Regional mirror server 66 operates to maintain processing engine 68 and regional server 70 so that they mirror the state of regional server 62 and processing engine 60. This mirroring allows sub-node 54 to replace sub-node 52 if, for some reason, sub-node 52 goes off-line. In the event that sub-node 52 goes off-line, the primary function and secondary function of sub-node 54 can be reversed so that the primary function of sub-node 54 becomes operating as processing engine 68 and regional server 70. Similarly, the primary function and secondary function of sub-node 52 can be reversed, once sub-node 52 comes on-line, so that the primary function of sub-node 52 becomes operating as regional mirror server 64. After this switch, sub-node 54 would be the active sub-node, while sub-node 52 would be the mirror sub-node. Because processing node 50 has two mirrored sub-nodes, processing node 50 can survive a catastrophic failure of one of the sub-nodes without affecting its service to participating organizations. In one embodiment of the present invention, organizations are connected transparently to the active sub-node regardless of which sub-node they attempt to access.

When a plurality of processing nodes 50 are used within an electronic commerce network, the mirroring and back-up capability provided by each pair of sub-nodes allows each processing node 50, and thereby the entire network, to survive catastrophic failure at any of the sub-nodes. This robust feature is particularly important for an electronic commerce network because it is paramount that the network not go down for any significant length of time.

FIG. 3 is a block diagram of one embodiment of an electronic commerce distributed network, indicated generally at 80, formed by a plurality of processing nodes according to the teachings of the present invention. The processing nodes can be constructed as shown in and described with respect to FIGS. 1 and 2. In the embodiment of FIG. 3, electronic commerce distributed network 80 includes five processing nodes. A first processing node 82 is located in Dublin, Ohio. A second processing node 84 is located in Washington, D.C. Further processing nodes 86, 88 and 90 are located in Amsterdam/London, Brazil and India, as shown. It should be understood, of course, that the geographical locations for the processing nodes and the number of processing nodes in the network can be changed and implemented as desired.

Each processing node 82, 84, 86, 88 and 90 provides network connections for originator/recipient organizations 92 and processes electronic commerce messages communicated between organizations 92. Processing nodes 82, 84, 86, 88, 90 enable communication between organizations 92 using sub-nodes and processing engines as described with respect to FIGS. 1 and 2. Thus, it should be understood that each processing node shown in FIG. 3 includes two sub-nodes, each of which can operate as a processing engine, a regional server, and a regional mirror server. According to one aspect of the present invention, a processing node of the network 80 of FIG. 3 could serve as a private electronic commerce network for organizations 92 located within the local geographic area of the processing node. A processing node could also serve as a reseller of electronic commerce functionality to trading partners located within its regional area. Thus, it is possible for equipment to be supplied to entities in different countries such that those entities can establish processing nodes on the network and become resellers of electronic commerce value added network technology within their region.

Figure 4:
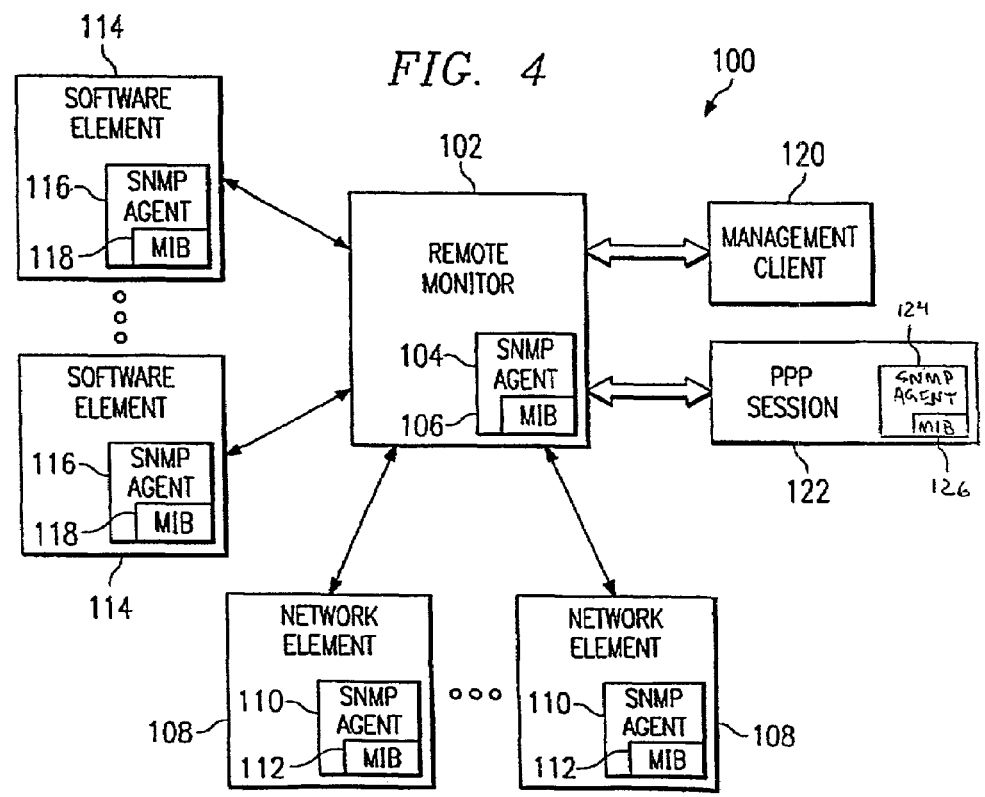
FIG. 4 is a block diagram of one embodiment of a system for managing network integrity in an electronic commerce network.

FIG. 4 is a block diagram of a system, indicated generally at 100, for managing network integrity within an electronic commerce network. System 100 can be used within an electronic commerce distributed network as shown in and described with respect to FIGS. 1, 2 and 3. However, system 100 can also be used in other types of electronic commerce networks. As shown in FIG. 4, system 100 includes a remote monitor 102 that has a simple network management protocol (SNMP) agent 104 which maintains a management information base (MIB) 106. Remote monitor 102 is connected to and communicates with a plurality of network elements 108. Network elements 108 represent various hardware elements within the electronic commerce network such as computers, modems, printers, etc. Each network element 108 includes an SNMP agent 110 that maintains a MIB 112. Remote monitor 102 also is connected to and communicates with a plurality of software elements 114 within the electronic commerce network. Software elements 114 represent various software applications running within the network including, for example, the processing engine, regional server and regional mirror server of FIGS. 1 and 2. Each software element 114 includes an SNMP agent 116 which maintains a MIB 118. SNMP agents 104, 110 and 116 store information representing the status of their respective network pieces in MIBs 106, 112 and 118. SNMP agents 104, 110 and 116 also communicate with remote monitor 102 across the electronic commerce network.

Remote monitor 102 can receive and store MIB information from SNMP agents 104, 110 and 116 which can be sent in response to certain events or in response to a query from remote monitor 102. In this manner, remote monitor 102 operates to collect health information about the network based upon the information stored in MIBs 106, 112 and 118. Each MIB 106, 112 and 118 can be a sequential file of information which describes the status of the associated network element 108 or software element 114. Remote monitor 102 can query SNMP agents 104, 110 and 116 to get that information and thereby obtain status of the network hardware elements 108 and software elements 114. In one embodiment, the various SNMP agents 104, 110 and 116 communicate using an IP address on the network. Each SNMP agent 104, 110 and 116 is able to record information based upon traps of events and to record information based upon queries from remote monitor 102. For example, each MIB 118 can maintain information about software elements 114 such as the number of characters transmitted per hour and the number of responses communicated per hour. Remote monitor 102 collects and organizes the information gathered from SNMP agents 104, 110 and 116.

A management client 120 communicates with remote monitor 102 to provide access to information maintained by remote monitor 102. In addition, a point-to-point protocol (PPP) session 122 can be used to connect to and access information in remote monitor 102. Management client 120 provides access to remote monitor 102 in order to present the MIB information to a user as well as to monitor and display problems with the electronic commerce network. In one embodiment, the connection between management client 120 and remote monitor 102 is over an IP network. After receiving status information from remote monitor 102, management client 120 can determine the status of the network and compare the network status with desired or threshold values. Management client 120 can then notify a user of problems with the network in real-time as those problems occur. In one embodiment, management client 120 can display network status information on a map that illustrates the geographical locations of the various parts of the network. In one implementation, management client 120 is based upon a HEWLETT PACKARD OPEN VIEW system although a SUN SOLSTICE, IBM NETVIEW or other appropriate system could be used.

PPP (point-to-point protocol) session 122 can also be used to connect to and receive information from remote monitor 102. Using PPP session 122, a user can receive the SNMP messages that SNMP agents 104, 110 and 116 use to communicate the MIB information. PPP session 122 can set thresholds that indicate when the MIB information represents a trouble situation and can notify a user of the problem. Even where there are no problems, PPP session 122 can also provide a user with the current state of the network. The MIB information can be parsed and sorted so that different organizations can use PPP session 122 to access only the MIB information relevant to their interest in the electronic commerce network.

An additional feature is that after an organization has connected into remote monitor 102 via PPP session 122, the organization's connection software application can itself have an SNMP agent 124 that maintains a MIB 126. In this manner, remote monitor 102 can receive information about the organization's computer system. An owner or operator of the electronic commerce network and of management client 120 could then proactively monitor the status of the organization who invoked PPP session 122 and inform the organization of problems before the organization, itself, is be aware.

System 100 can provide, for example, two important network integrity management functions. System 100 can allow an owner or operator of the electronic commerce network to monitor the state of the network in real-time so that problems can be quickly identified or even anticipated. System 100 also provides participant organizations with a window into the state of the electronic commerce network. The status of the network can be securely broadcast to organizations in the form of MIB information so that the organization can have higher confidence in the integrity of the electronic commerce network.

Although the present invention has been described in detail, it should be understood that various changes, substitutions and alterations can be made hereto without departing from the spirit and scope of the invention as defined by the appended claims.

What is claimed is:

1. A processing engine for a processing node of an electronic commerce distributed network, the processing engine comprising:

a plurality of communication units operable to communicate with participating organizations in a plurality of communication protocols, the plurality of communication units further operable to receive electronic commerce messages from originator organizations and communicate said electronic commerce messages to recipient organizations;

an engine operable to process an electronic commerce message received from an originator organization and to build an outgoing electronic commerce message for transmission to a recipient organization, wherein the engine accomplishes processing and building by:

accessing profiles that defines characteristics for the originator organization and the recipient organization; and invoking selected functions from a plurality of functions where the selected functions are chosen based upon the profiles for the originator organization and the recipient organization;

an interface unit coupled to and communicating with the plurality of communication units and the engine, the interface unit allowing incoming and said outgoing electronic commerce messages to be communicated between the plurality of communication units and the engine;

the processing engine providing electronic commerce interconnectivity for participating organizations that have different computer and communication environments; and wherein the plurality of communication units includes a plurality of Internet mail units, and the processing engine further comprising a gateway coupled to the plurality of Internet mail units and the engine, the gateway operable to interface between a communication protocol of the plurality of internet mail units and a communication protocol of the interface unit.

2. The processing engine of claim 1, wherein the interface unit is an X.400 unit operable to communicate using an X.400 protocol.

3. The processing engine of claim 2, wherein the plurality of communication units comprise a P1 unit and a P7 unit.

4. The processing engine of claim 1, wherein the plurality of Internet mail units comprise an SMTP unit, a MIME unit and a POP unit.

5. The processing engine of claim 1, wherein the profiles of the originator organization and the recipient organization are accessible via an external user interface.

6. The system of claim 1, wherein the selected functions comprise an electronic data exchange conversion.

7. The system of claim 1, wherein the selected functions comprise virus checking.

8. The system of claim 1, wherein the selected functions comprise providing a translation.

9. The system of claim 1, wherein the processing engine maintains audit files of the selected functions, the audit files accessible via an external user interface.

10. A method for an electronic commerce distributed network, comprising:
   communicating with participating organizations in a plurality of communication protocols using a plurality communication units;
   receiving electronic commerce messages from originator organizations and communicating said electronic commerce messages to recipient organizations;
   processing at a processing engine an electronic commerce message received from an originator organization and building an outgoing electronic commerce message for transmission to a recipient organization by:
      accessing profiles that defines characteristics for the originator organization and the recipient organization; and
      invoking selected functions from a plurality of functions where the selected functions are chosen based upon the profiles for the originator organization and the recipient organization;
   allowing incoming and said outgoing electronic commerce messages to be communicated between the plurality of communication units and the engine at an interface unit;
   providing electronic commerce interconnectivity for participating organizations that have different computer and communication environments; and
   interfacing between a communication protocol of a plurality of Internet mail units of the communication units and a communication protocol of the interface unit.

11. The method of claim 10, wherein the interface unit is an X.400 unit operable to communicate using an X.400 protocol.

12. The method of claim 11, wherein the plurality of communication units comprise a P1 unit and a P7 unit.

13. The method of claim 10, wherein the plurality of Internet mail units comprise an SMTP unit, a MIME unit and a POP unit.

14. The method of claim 10, wherein the profiles of the originator organization and the recipient organization are accessible via an external user interface.

15. The method of claim 10, wherein the selected functions comprise an electronic data exchange conversion.

16. The method of claim 10, wherein the selected functions comprise virus checking.

17. The method of claim 10, wherein the selected functions comprise providing a translation.

18. The method of claim 10, wherein the processing engine maintains audit files of the selected functions, the audit files accessible via an external user interface.

19. A system for an electronic commerce distributed network, comprising:
   means for communicating with participating organizations in a plurality of communication protocols using a plurality communication units;
   means for receiving electronic commerce messages from originator organizations and communicating said electronic commerce messages to recipient organizations;
   means for processing at a processing engine an electronic commerce message received from an originator organization and building an outgoing electronic commerce message for transmission to a recipient organization by:
      accessing profiles that defines characteristics for the originator organization and the recipient organization; and
      invoking selected functions from a plurality of functions where the selected functions are chosen based upon the profiles for the originator organization and the recipient organization;
   means for allowing incoming and said outgoing electronic commerce messages to be communicated between the plurality of communication units and the engine at an interface unit;
   means for providing electronic commerce interconnectivity for participating organizations that have different computer and communication environments; and
   means for interfacing between a communication protocol of a plurality of Internet mail units of the communication units and a communication protocol of the interface unit.

\* \* \* \* \*